INVENTOR.
GRAYDON L. BROWN &
BOBBY J. THOMAS

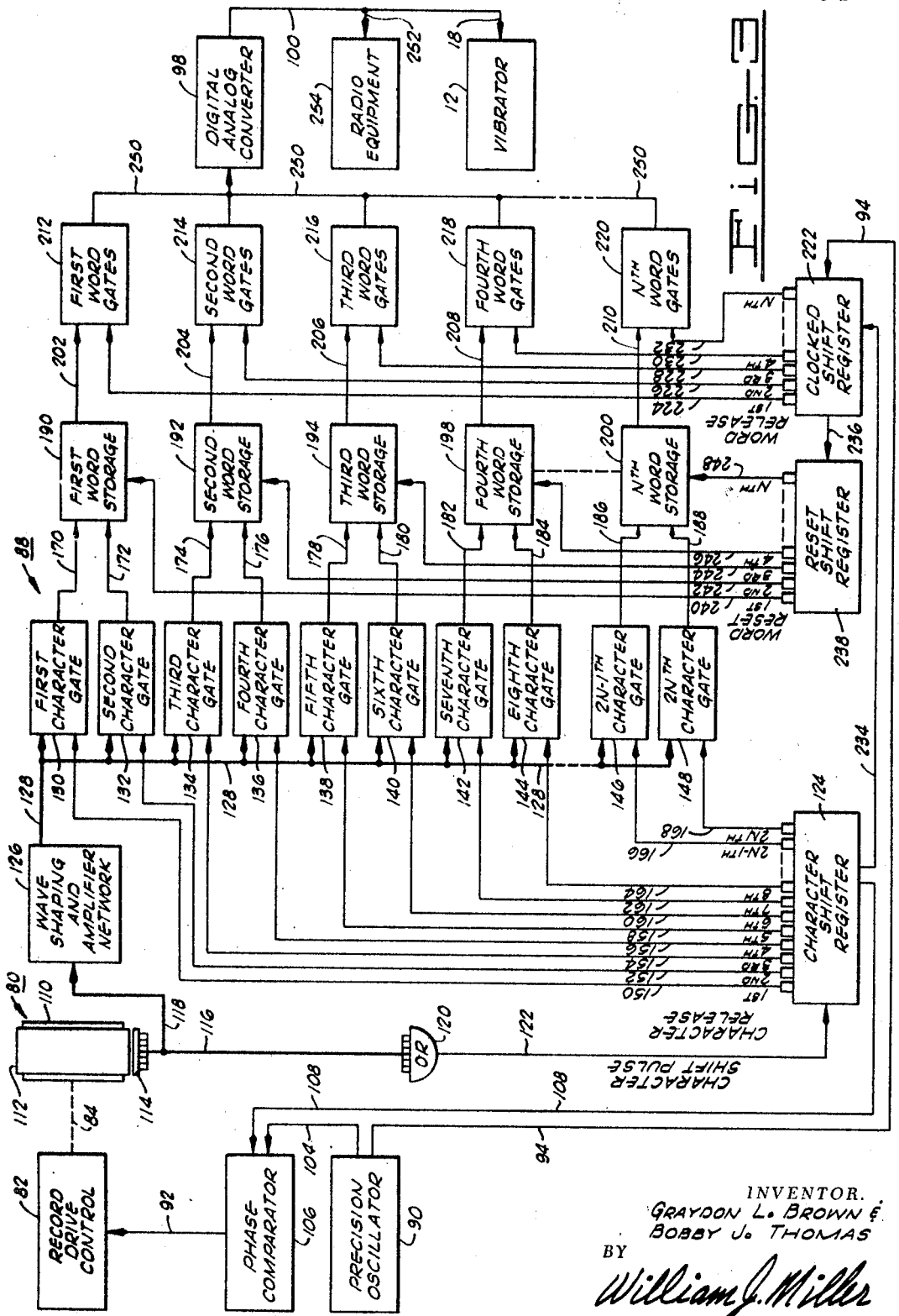

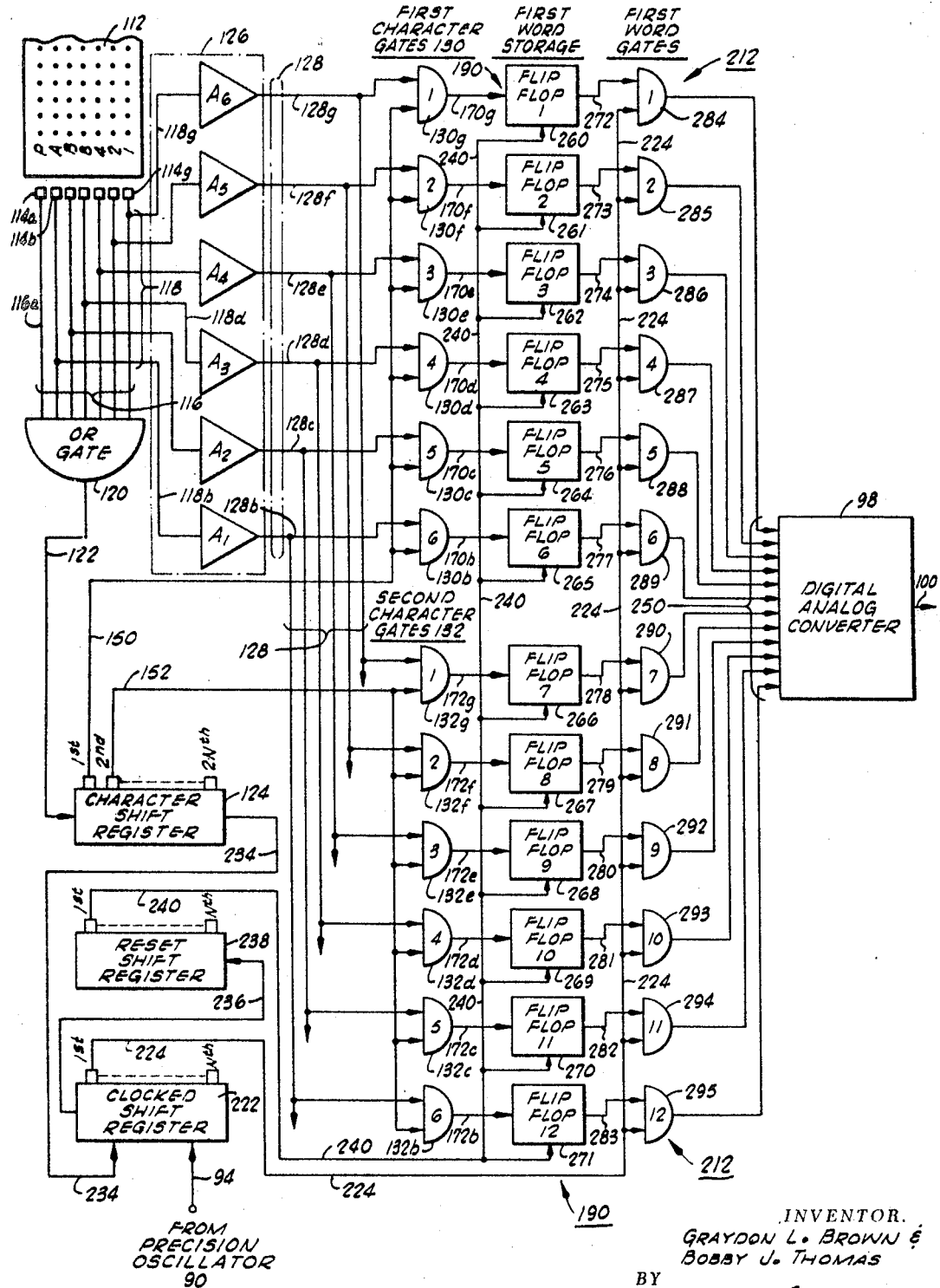

United States Patent Office 3,460,648
Patented Aug. 12, 1969

3,460,648
DIGITAL SYSTEM FOR CONTROLLING A SEISMIC VIBRATOR
Graydon L. Brown and Bobby J. Thomas, Ponca City, Okla., assignors to Continental Oil Company, Ponca City, Okla., a corporation of Delaware
Continuation of application Ser. No. 594,790, Nov. 16, 1966. This application Aug. 29, 1968, Ser. No. 757,222
Int. Cl. G01g 1/02
U.S. Cl. 181—.5                    13 Claims

ABSTRACT OF THE DISCLOSURE

A system for controlling a seismic vibrator comprising a computer for producing an electrical control signal having predetermined frequency characteristics in digital form, a recorder for recording the control signal and transferring the recorded signal to an intermediate storage device, wherein a timing device is connected for controlling the release of the stored control signal to an analog to digital converter which converter signal is used to drive the seismic vibrator.

---

Figure 1:
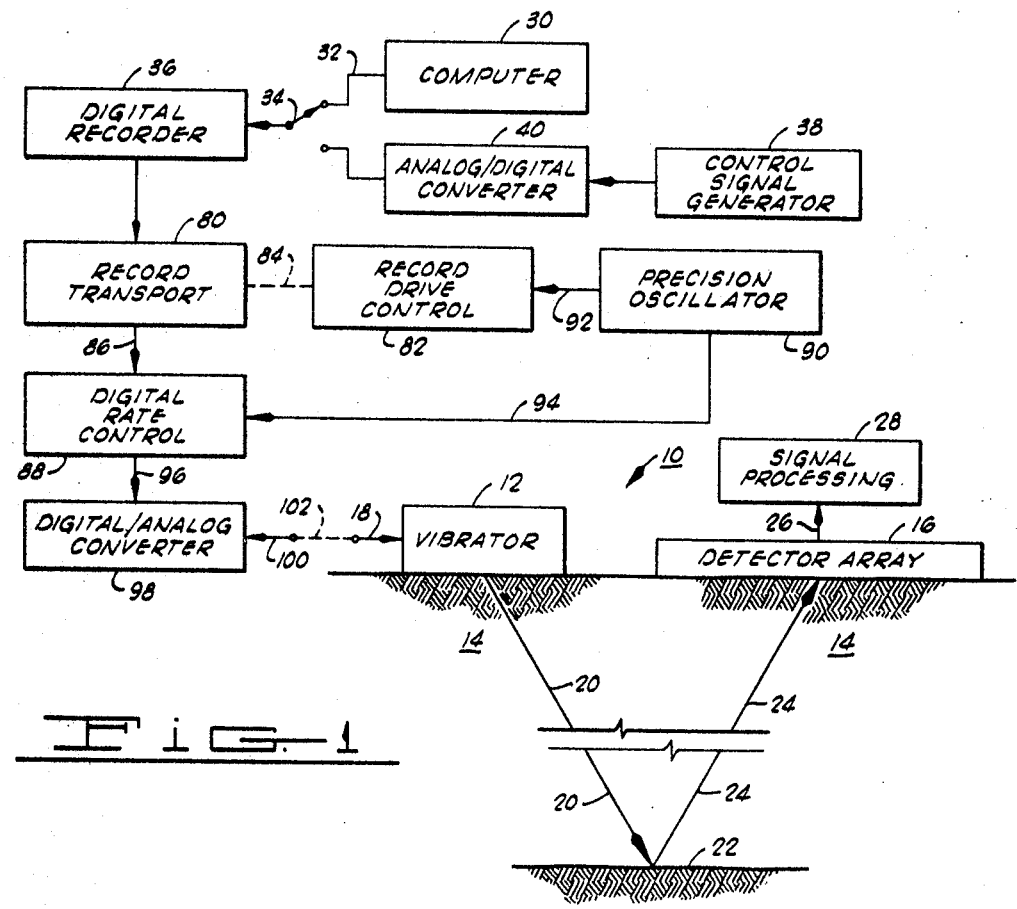

This application is a continuation of application Ser. No. 594,790, filed Nov. 16, 1966, now abandoned.

This invention relates to improvements in the art of geophysical prospecting and, more particularly, but not by way of limitation, to a method and apparatus for developing a highly accurate control signal of desired frequency limits and proportions for controlling the output of a seismic vibrator.

In vibrational seismic surveying it is highly desirable to impart vibrator seismic energy which has predetermined frequency characteristics into the earth. The subsequent signal processing and correlation of the detected returned seismic signals can then yield enhanced results. It has been found that digital control methods enable the generation of a more ideal seismic energy input into the earth, an input which is better shaped as to amplitude and periodicity, such that a minimum of deleterious effects due to minor instrumentation errors of certain periodicity need be considered. The broad concept of digital control is disclosed in the previously filed application, Ser. No. 559,460, entitled "Digitally Controlled Vibrational Seismic Prospecting" in the name of Heath et al. and assigned to the present assignee.

The present invention contemplates a system for digitally controlling the seismic energy generation in a vibrational surveying system in such manner that minute time variations of the digital control signal are corrected in a digital rate control so that a still greater accuracy of seismic output generation is obtained. More particularly, the invention contemplates the processing of a digitally recorded control signal, recorded as successive characters or digital words, such that each successive digital word is placed in an intermediate storage and clocked out under control of a highly accurate precision oscillator for conversion digital-to-analog and application as the energizing signal to a seismic vibrator.

Therefore, it is an object of the present invention to provide a digital rate control system which enables an output control signal that is free from wow and flutter for controlling a vibrational seismic source.

It is a further object of the present invention to provide a signal rate control system wherein rate variations caused by minute discrepancies in the equipment operation are corrected such that the desired signal is always clocked out at a proper, predetermined rate for subsequent utilization.

Finally, it is an object of the invention to provide a digital rate control, including intermediate storage and gating out devices, for receiving input digital electrical values from a digital transport and playback equipment, the rate control serving to correct for variations in the playback transport speed such that an output control signal having a constant, true rate is delivered.

Other objects and advantages of the invention will be evident from the following detailed description when read in conjunction with the accompanying drawings which illustrate the invention.

Figure 2A:
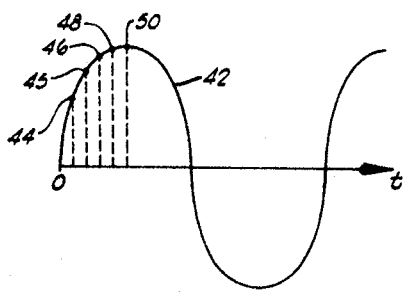
Figure 2B:
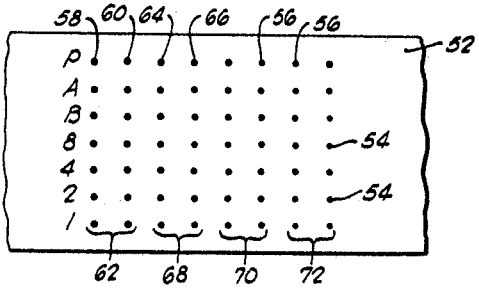

In the drawings:
FIG. 1 is a functional block diagram showing the digital rate control of the present invention in relationship to vibrational seismic surveying equipment;
FIG. 2A represents a portion of an exemplary seismic vibrator control signal as it may be derived for application in controlling a seismic survey;
FIG. 2B is an exemplary showing of a portion of digital tape containing sequential character values in a plurality of channels which are representative of that control signal shown in FIG. 2A;
FIG. 3 is an overall block diagram of the digital rate control system as it would be connected to receive a seismic vibrator control signal; and
FIG. 4 is an enlargement of a portion of FIG. 3 to show various of the digital components and their interconnections with greater clarity.

The usual form of vibrational survey system is shown by the survey equipment 10 in FIG. 1. These consist of a vibrator 12 positioned on the surface of an earth medium 14 and, spaced at some distance, a suitable geophone or other detector array 16. As is well-known, the vibrator 12 is caused to vibrate by a predetermined control signal as applied on input lead 18; whereupon seismic vibrations are imparted into the earth 14. The seismic vibrations are directed downwardly through the earth 14; whereupon they are reflected by various subterranean anomalies and are finally detected upon return to the surface of the earth medium 14 by the detector array 16. One exemplary propagation path is shown as the downward path 20 which is reflected from an interface 22, deep within the earth, the energy then travelling upward on propagation line 24 for detection by the detector array 16. The seismic energy from the detector array 16 is then present in the form of electrical signals on lead or cable 26 for conduction or transportation to subsequent signal processing, shown generally as block 28.

An input control signal for application on input lead 18 to drive the vibrator 12 may be generated by either analog or digital means, the digital methods being of relatively recent development. As shown in FIG. 1, digital generation means are employed and alternative digital means are included. One manner of generation is to program a computer 30 to provide an output on lead 32 through switch 34 of the digital control signal. The digital control signal may consist of a series of digital electrical values representative of the desired and predetermined control signal, and the serial digital values may be conducted from switch 34 for recording by conventional digital recording means in the digital recorder 36. An alternative form of recording may be carried out by generating the desired sweep signal in a control signal generator 38, converting the output signal to digital electrical values in the analog-digital converter 40, and, thereafter, conducting the digital electrical values through switch 34 to digital recorder 36 to construct the desired digital record.

In accordance with conventional vibrational survey practice, the control signal would consist of a continuous alternating current output which is preferably either an upsweep or a downsweep of frequencies between limits of approximately 2 through 100 cycles per second. Such practice is well known in the art and the advantages as to upsweep, downsweep and frequency limits are a matter of choice dependent upon the terrain and the particular survey operation. Recent developments tend to show that the construction of the control signal by means of a computer 30 has unique advantages since various control signal allowances can be made for earth effects and other filter characteristics by means of properly programming the computer 30. Thus, for each terrain, and after suitable primary test runs have been made, it is possible to program computer 30 to generate sequential digital electrical values which are equivalent to a desired control signal that is optimum for that terrain.

FIG. 2A shows a short duration segment of control signal 42 as it may occur through a time zero to $t$. The analog control signal portion 42, representing an analog amplitude undulation, would be digitally represented by sequential digital words representative of the instantaneous amplitude or amplitude of a particular sample and its sign or polarity. Thus, the control signal 42 would be represented by successive digital electrical values representative of positive amplitudes for the analog signal sample values 44, 45, 46, 48, and 50, sequentially. Such digital values would actually represent a step function but it can easily be seen that by decreasing the incremental divisions or by use of interpolation filtering, the step effects can be diminished accordingly. Thus, depending upon the resolution desired, the sampling rate or speed at which digital evaluation repeats can be selected at any desired repetition rate within limits of the equipment, and this limit, as respects digital equipment, allows great latitude.

FIG. 2B shows a section of digital tape 52 containing seven tracks 54 of periodic magnetizable areas which line up transverse of the digital tape 52 as columns 56. It should be understood here that this is only one form of format which may be employed in the present invention. This exemplary digital recording technique employs a conventional binary format enabling a fourteen bit data value (including parity bits). That is, each data value is represented by two serial characters, as characters (seven bit columns) 58 and 60 across the digital tape 52. Each of the seven bit characters may be employed to show the required digital information in code form. The preferred form, and the form denoted in FIG. 2B, reserves one track P for odd bit parity purposes while the remaining tracks 1, 2, 4, 8, B and A are employed for binary coded representation of digital values. The resolution or accuracy of the digital system is further increased by employing two of the seven bit digital characters for each digital value or word (odd bit parity check for each character).

A comparison of the digital values of FIG. 2B may be drawn to the analog curve 42 of FIG. 2A. That is, characters 58 and 60, making up a first digital word 62, would binarily represent the digital value of time sample portion 44 of the control signal curve 42. Similarly, characters 64 and 66 make up the next digital word 68 which, in turn, represents the next time sample segment 45 of control signal 42. Thus, digital word 70 represents analog signal sample 46, digital word 72 represents analog signal sample 48, etc. The type of digital recording is a matter of choice, e.g., the digital recording can take place in non-return-zero (NRZ) mode or in other well-known modes, and the method and circuitry of parity check is a matter of choice and well-known in the art.

Referring again to FIG. 1, a pre-recorded control signal constituted in digital record form on digital recorder 36 may be removed and placed on a suitable record transport 80 for field playback or reconstitution of an analog signal for the purpose of driving the seismic vibrator 12. The record playback may be carried out in the field or at a remote location with radio linkage (to be described), and it should be understood that the same transport and drive instruments may be employed both as digital recorder 36 and record transport or playback means 80.

The record transport 80 is driven by a record drive control 82 via linkage 84, and the played back digital word values are present on cable 86 to the digital rate control 88, the primary portion of the present invention as will be further described below. The record drive control 82 is preferably of a highly accurate type such as that disclosed in a copending U.S. patent application, Ser. No. 391,410, filed Aug. 24, 1964, now Patent No. 3,361,-949, entitled "Motor Control Servo-System" in the name of Brown et al. and assigned to the present assignee. This drive system exhibits characteristics whereby the wow and flutter is less than .5 percent peak-to-peak in the band of 2 to 200 cycles per second, and such reliability is particularly desirable in development of a vibrational control signal.

An integral part of the drive control 82, and a portion from which the drive control derives its extreme accuracy, is the precision oscillator 90 which provides a signal at a reference or standard frequency with which the drive rates can be controlled. Thus, the precision oscillator 90 provides control via line 92 to the record drive control 82 and it also provides an output clock signal on line 94 to control the digital rate control 88 as will be more particularly described below in the description of FIG. 3.

The digital rate control 88 serves to account for time variations between digital word values received on input 86 such that the digital word values are clocked out on lead 96 at a rate which is both constant and proper for the desired control signal. The digital word values on lead 96 are then applied successively to the digital/analog converter 98; whereupon the desired analog control signal is present on output 100. A dotted line connection 102 is interposed to show that such an analog control signal may be applied to input 18 of seismic vibrator 12 either directly or by radio transmission-reception means as is sometimes employed in the field. It should be understood too that some systems may employ radio transmission of digital signal information by merely placing the radio link between digital rate control 88 and a subsequent converter stage 98. In any event, the analog control signal on output 100 will be the proper one to drive the vibrator 12 in a desired manner. A counterpart of the control signal, either detected adjacent vibrator 12 or otherwise tapped off to provide a replica of the input drive signal, may be employed at the signal processing equipment 28 for correlation and other comparisons in the well-known manner.

An enlarged, more specific showing of the digital rate control 88 (FIG. 1) is shown in FIG. 3. Components common to both FIGS. 1 and 3 are identified by like numerals. The precision oscillator 90 provides an output on a lead 104 to a conventional phase comparator 106 for comparison with a character count output pulse on lead 108. The output on lead 92 is then used to control the drive control 82, and the mechanical motion is transmitted via a suitable shaft or linkage 84 to the record transport 80 which is, in this case, a recorder drum 110. A digital record 112 is carried by the record transport drum 110. The record 112 is similar to that shown in FIG. 2B such as would be recorded by the digital recorder 36 of FIG. 1.

Digital signal pickup 114, a multichannel head, is disposed adjacent the record 112 to pick up each parallel channel of digital signals for conduction via cables 116 and 118 to the digital rate control 88. Cable 116 conducts each of the digital electrical signals in parallel to an OR gate 120, the output of OR gate 120 providing a character count or shift pulse on lead 122 to a character shift register 124. The plurality of parallel digital electrical values are also present on the parallel leads of cable 118 to a suitable wave-shaping and amplifying network 126. The wave-shaping and amplifier network 126 consists of conventional wave-shaping and amplifying circuits in parallel; each receiving an input from cable 118 of one of the parallel digital tracks on record 112. Such wave-shaping circuitry and its utilization is well known in the digital pulse processing art.

Parallel outputs from the wave-shaping and amplifier circuitry 126 are then provided on parallel leads of the branched cable 128 for input to a plurality of character gate groups. Each successive plurality of character grouping of digital electrical bits is conducted via cable 128 for input to each of the coincidence character gates. That is, the plural digital bit values of each character are applied in parallel to each of first character gate 130, a second character gate 132, third character gate 134, fourth character gate 136, fifth character gate 138, sixth character gate 140, seventh character gate 142, eighth character gate 144, and so on through the 2N–1th character gate 146 and, finally, the 2Nth character gate 148. The number 2N of character gates is a matter of choice, depending upon the cumulative errors of the input equipment as will be further described below.

Thus, each character of digital bit information is present in parallel to all character gates 130–148, first through 2Nth, and the passage of the digital bit values through one of the gates will be in accordance with coincidence control as exercised by the character shift register 124. That is, according to the character shift count output a character release pulse will be transmitted to enable one of the character gates 130 through 148. The character shift register 124, a conventional type of shift register having a size and output function in accordance with the particular equipment requirements, receives a count or character shift pulse on lead 122 from the OR gate 120 for each character read out from the digital record 112 by pickup head 114. It may be noted here that even though the digital count readout from head 114 is zero for all digital bits, there will still be a count output to OR gate 120 due to the inclusion of the seventh track of odd bit parity information. Thus, for each character read out from digital record 112 a character shift pulse on line 122 energizes character shift register 124 to enable a single character release output. Character release outputs are successively present on leads 150, 152, 154, 156, 158, 160, 162, 164 and so on through leads 166 and 168 to successive ones of the first through 2Nth character gates 130 through 148. Enablement by a character release pulse on one of leads 150–168 allows passage of the plural digital bit values for a particular character through its respective character gate 130–148 for intermediate storage.

As previously stated, in this example the binary format selected is that of twelve digital bits in two successive characters to make up each digital word. Hence, the character gates 130–148 are paired to supply two character outputs in parallel to each of the word storage devices which store each digital bit of each digital word until the information is later called upon or clocked out (as will be described). Thus, outputs from each of the first through 2Nth character gates 130 through 148 are present (upon character release actuation from character shift register 124) upon the leads 170, 172, 174, 176, 178, 180, 182, 184 and, finally, leads 186 and 188 such that successive pairs are applied as inputs to first word storage 190, second word storage 192, third word storage 194, fourth word storage 198 and, finally, the Nth word storage 200. Word storage may be effected by the use of various intermediate storage devices; however, in this description it will be assumed that conventional bi-stable flip-flop devices are used. Thus, each of the word storage devices 190 through 200 would consist of twelve flip-flop devices in parallel, one for receiving and holding a state indication for each digital bit value.

A parallel output of each digital information bit is available on outputs 202, 204, 206, 208 and so on through 210 through a plurality of paralled AND gates which makeup each of the first word gates 212, second word gates 214, third word gates 216, fourth word gates 218 and so through the Nth word gates 220. Each of the word gates 212 through 220 is enabled by word release pulses which are clocked out of the shift register 222 in successive manner on output leads 224, 226, 228, 230, and so on through lead 232 to each of the word gates 212–220.

The clocked shift register 222 is controlled very precisely in synchronism with the input on lead 94 from precision oscillator 90 which also provides original timing control of the record drive control 82 and, therefore, the transport 110 speed or the digital input rate. Upon beginning a digital control signal sequence, the clock shift register 222 is caused to wait a predetermined time before initiating any readout of digital word values. This overall delay of all digital values will then allow the digital rate control 88 to correct for both leads and lags of individual digital values as read out from record 112. The amount of this basic delay time will depend upon the initial accuracy of the record drive control 82, and the number N of possible digital word values which will be maintained adjustable through intermediate storage may be set in accordance with the exigencies of the operation and equipment.

This basic or initial count delay of the clock shift register 222 is effected by means of a "start" pulse applied on lead 234 and derived after a predetermined number of character shift pulse receptions at the character shift register 124. This is a conventional pulse delay practice requiring only that output on lead 234 be responsive to a predetermined count output of character shift register 124. In the present case of N digital word positions with 2N character positions, clocked shift register 222 would be enabled coincident with the Nth character release pulse by an enabling pulse on lead 224.

The clocked shift register 222 also provides a reset count pulse on lead 236 for energizing the reset shift register 238. Reset count control is effected by a "word release plus one" energization of clock shift register 222 to provide a shift pulse on input 236 to the reset shift register 238, shift register 238 providing successive count outputs in conventional manner. Successive word reset pulses are thus provided on leads 240, 242, 244, 246 and so on through the Nth lead output 248 to reset the respective first through Nth word storage devices 190 through 200. Thus, taking first word digital progression for example, after the digital word stored in first word storage 190 has been enabled through first word gates 212 by means of a coincident "word release" pulse on lead 224 from clocked shift register 222, the next succeeding pulse or count of clocked shift register 222 is provided on lead 236 to energize reset shift register 238 such that a word reset output is enabled on lead 240 for input to first word storage 190 to thereby clear it for its next succeeding use. The periodicity of such use of each storage and gating device will, of course, depend upon the overall required digital accuracy and the degree of timing variation necessary to effect such accuracy.

As each of the first through Nth word gates 212–220 is enabled, their respective digital bit values are presented in parallel on leads 250 to a conventional digital-to-analog converter 98 for final constitution of the control signal. Digital/analog converter 98 may be a conventional and commercially available type of converter which provides an analog control signal output on line 100. As previously stated, the field setup may be such that the analog control signal on line 100 is applied directly through line 18 to drive a vibrator 12 (FIG. 1); or, it may be the desired function to apply the analog control signal through lead 252 to suitable radio equipment 254 for the purpose of relaying the control signal to a remote installation as either a drive signal or a signal processing replica.

FIG. 4 is an exemplary showing of an enlarged portion of the FIG. 3 circuitry to illustrate the parallel routing or logic of the digital circuitry for a single digital word signal path. FIG. 4 illustrates circuitry applicable for the selected digital format of twelve bit digital words in two serial characters; however, it should be kept in mind that the number and interconnection of circuit elements may be varied to a large degree in accordance with other digital formats which may be selected. Further, while the first word storage 190 is illustrated as a plurality of flip-flop circuits, certain design considerations may dictate the application of other types of intermediate storage devices.

Thus, a digital character is read off by individual, track-aligned pickup heads 114a through 114g to provide seven digital bit indications in parallel. Such digital bit indications are of the zero and one variety and as they are applied to OR gate 120 a count output is present on lead 122 for each character. This character count is effected even when all digital values are zero due to odd bit parity readout through head 114a and lead 116a. The character count output on lead 122 then controls the character shift register 124 to produce a gate enabling pulse as will be further described.

Digital values as picked up by digital heads 114b through 114g are applied through parallel leads 118b through 118g to respective amplifiers $A_1$ through $A_6$ of the wave-shaping and amplifier network 126. Amplifiers $A_1$–$A_6$ provide outputs of the instantaneous parallel digital bit values on the branched cable 128 (parallel leads 128b through 128g) to all character gates. As clarified by FIG. 4, each character gate consists of six parallel AND gates, each functioning to control a digital bit of information. Thus, each of the parallel leads 128b through 128g applies its digital bit information to the respective inputs of AND gates 130b through 130g of first character gates 130 and, in parallel, to the respective inputs of AND gates 132b through 132g of second character gates 132, as well as similar parallel application to the six AND gates of each of the third through the 2Nth remaining character gates as shown in FIG. 3. Thus, each character of digital bit information is presented to all character gates 130–148 (FIG. 3) and the character gate which passes the digital bit values will be that one enabled by the character shift register 124 as controlled by character count pulses 122 from the OR gate 120. As shown in FIG. 4, the first character gates 130b–130g are each controlled by a "character shift" pulse on lead 150 and the next successive "character shift" output on lead 152 is applied to enable the second character gates 132b–132g.

As the outputs from respective first and second character gates 130 and 132 are successively enabled the outputs are conducted in parallel to a first word storage 190 which consists of twelve parallel flip-flop circuits 260 through 271. The outputs of the flip-flops 260 through 271 are then available on respective output leads 272 through 283 for conduction through AND gates 284 through 295 of first word gates 212 when they are enabled. An enabling or "word release" pulse is applied on lead 224 in parallel to all AND gates 284 through 295 in response to a shifted count from the clocked shift register 222. A "word release plus one" output pulse is also counted out of clocked shift register 222 on lead 236 to actuate the reset shift register 238. The successive outputs of reset shift register 238 are then applied on lead 240 in parallel to all of the storage flip-flops 260 through 271 for the purpose of clearing them after their digital word value has been gated on or utilized by the equipment. As shown in FIG. 4, utilization of the digital values of a first digital word would be effected when shift register 222 clocks a first "word release" pulse out on lead 224 and all digital values stored in flip-flops 260 through 271 are enabled for conduction through AND gates 284 through 295 on the plurality of parallel leads 250 to the digital to analog converter 98.

Although not specifically shown in FIG. 4, it should be kept in mind that the plurality of parallel leads 250 are also connected to receive digital values from the remaining word gates 214 through 220 (FIG. 3) as they too are energized in their proper sequence, the digital-to-analog converter 98 serving to receive all digital values in proper succession to thereby contruct the desired analog control signal for application in the vibrational survey system.

OPERATION

The present data rate control equipment can be used to produce a control signal which has a ripple-free spectrum to thus enable realization of maximum potential in vibrational seismic surveying operations. The analog drum systems which are presently used to manufacture and transmit a vibrator control signal have speed variations which may cause a rippled spectrum by varying or modulating the sweep frequency at a rate related to speed changes. While practical limitations will not allow that the analog drum or transport systems be free of speed variations, the data rate control system allows the use of the same analog transport system while giving an increased accuracy as needed to obtain a ripple-free spectrum.

A digital record 112 may first be produced from a computer or other signal generation means which carries a digital representation of a desired vibrator control signal. The control signal may have characteristic frequency range and frequency proportion with variations to account for terrain and other factors which affect survey operation. The exemplary digital record shown herein (FIGS. 2B and 4) discloses an IBM type of format wherein seven digital tracks are displaced across the digital tape. One track, an outer track, is employed for odd-bit parity purposes and the remaining six tracks are used to convey successive six-bit characters of digital information. The digital word consisting of two consecutive characters. It should be understood, of course, that various other formats and recording techniques may be employed in the practice of the present invention.

Referring now to FIG. 3, reference to other figures being noted, the description of the operation proceeds. A digital record bearing a digital representation of the desired control signal is mounted for playback on the record transport 110 as controlled by the record drive control 82 and the precision oscillator 90. One satisfactory form of record drive control 82 and precision oscillator 90 is that disclosed in the aforementioned U.S. patent application, Ser. No. 559,460. Large speed variations of the record transport 110 would be corrected in well-known manner by means of phase locking the drive control 82 with the precision oscillator 90 which provides the standard timing signal. Large phase error deviations having been accounted for, the problem overcome by the character count of the digital rate control 88 is that of correcting for the minute errors which appear as wow and flutter and so modulate the spectrum of the control signal. Successive characters of digital information are read from the digital record 112 by means of the plural head pickup 114. The parallel digital bits of each character are successively clocked through the digital rate control 88 which includes an intermediate storage and, thereafter, the successive digital characters are regenerated at a precise rate such that an exact analog control signal can be reconstituted.

Thus, each digital character consisting of six digital bits in parallel is conducted through an OR gate 120 to provide a "character shift" pulse on lead 122 with which the character shift register 124 is energized through its shift sequence. The same six parallel digital bits are applied through the wave-shaping and amplifier network 126 and then in parallel to individual bit gates (i.e., 130b through 130g of FIG. 4) of each of the first, second, third, etc., through the 2 Nth character gates, character gates 130 through 148. One of the character gates will conduct the six parallel digital bits depending upon the shift state of character shift register 124 and which one of the enabling leads 150 through 168 has been energized.

This is clearly shown in FIG. 4 for the case of first and second character gates 130 and 132 as enabled by first and second "character release" pulses on leads 150 and 152 respectively. Thus, with first character count read from digital record 112 and OR gate 120 responding to shift character shift register 124 such that a first character release pulse on lead 150 is conducted to enable each of the first character gates 130b through 130g, then the six digital bits which are also applied via leads 118b through 118g and amplifiers $A_1$–$A_6$ to the first character gates 130b through 130g can be conducted therethrough for storage in flip-flops 260 through 265 of first word storage 190. Similarly, the second digital character would give rise to six digital bits whose count would provide an enabling output on lead 152 from character shift register 124 to enable the second character gates 132b through 132g such that each of them would conduct its respective digital bit value as applied by parallel branches of cable 128, the conducted values serving to set the storage state of flip-flops 266 through 271 of first word storage 190.

After both characters of the first digital word have been read and gated through for storage in the first word storage 190, their respective digital indications are present on inputs 272 through 283 to the first word gates 212 which consist of AND gates 284 through 295. The clocked shift register 222, controlled by the precision oscillator 90, then counts an output successively on leads 224 through 232. These "word release" outputs to each of the first through the Nth word gates 212–220 enable the respective AND gates thereby releasing the twelve digital bits of the complete digital word to the digital-to-analog converter 98. The digital-to-analog converter 98 is a passive device which accepts its inputs on leads 250 from the plurality of word gates to reconstruct the desired analog voltage level.

The character shift register 124 begins its "character release" function immediately upon the initiation of the digital rate control 88 and, at the half-way point of its shift or count, an enabling pulse is present on lead 234 to start the clocked shift register 222. The start of the clocked shift register 222 enables "word release" output pulses as on leads 224 through 232 so that successive digital word values are released through their respective word gates 212 through 220 for periodic conversion to their analog signal counterparts. The clocked shift register 222 is started at a certain count after initiation of the character shift register 124 to assure a correct flow of digital values. That is, one-half of word storage is filled before the clocked shift register 222 is allowed to release any digital words to the digital/analog converter 98. This allows for the fluctuation of speed, either leading or lagging the desired constant or proper rate, at which the characters are read from the digital tape such that the digital word values are accurately clocked out. The amount of storage necessary depends upon the amount of speed variation in the record drive control 82 and record transport 110. When utilizing a servo record drive wherein wow and flutter of .5 percent peak-to-peak is obtained, and while rotating a digital sweep which was sampled every one millisecond, as few as ten words of storage are required to maintain a constant output or analog conversion signal. As the speed error increases, an increase in storage capacity is required in order to maintain correct flow of digital values to the output converter 98.

Each of the digital word storage devices 190 through 200 is reset by the shift register 238 after its stored digital word has been gated through the digital/analog converter 98. This word storage reset function is triggered by a "word plus one" pulse which is conducted out of the clock shift register 222 via lead 236 to the reset register 238 to thereby energize the proper "word reset" lead 240 through 248 to clear the associated word storage. In this manner, the cyclical readout, storage and release of digital word values can be repeated over and over again. When the storage capacity is filled, it is shifted back to the first storage area once again as it was previously reset after release of a digital word value to the digital/analog converter 98. This cycle repeats until the complete vibration control sweep signal has been read and clocked out; that is, until the entire sequence of digital word values recorded on a digital record 112 have been read in and stored in the digital rate control 88 and, thereafter, clocked out at some constant rate. This may take place by a cyclical routing of the digital characters and words through the limited number of word storage and gating devices as long as the number of word storage and gating devices is sufficient in number to allow for the maximum possible time variations of the signal sampling rate.

It is conceivable that some tape transports may be employed wherein the digital recording might have a long-term drift or speed error of plus or minus three percent. Considerably larger storage would be necessary to correct this amount of error. The increase in storage necessary would warrant the use of a small magnetic core as an intermediate storage device rather than the flip-flops since flip-flop costs would become prohibitive. Still another solution would be to use a large random access core, on which is large enough to store the total digital sweep, thus eliminating the need for a drum or transport system of any type. Here again the equipment cost would be increased considerably.

The foregoing sets forth a digital rate control system which enables control of the vibrator through a seismic survey operation in such manner that the survey results are greatly enhanced. The precise nature of the digitally-derived control signal allows the planning and carrying out of a seismic survey wherein the detrimental effects of minor instrumentation errors are greatly minimized due to the fact that the seismic vibrator and therefore the input signal can be controlled in a much more precise manner.

What is claimed is:

1. A system for controlling a seismic vibrator with a high degree of accuracy, comprising:
   computer means providing electrical control signals having predetermined frequency characteristics which signals are in the form of successive digital words represented by binary electrical pulses;
   means for recording said successive digital words;
   means for playing back said successive digital words;
   means for receiving said played back successive digital words and for placing each successive group of words in an intermediate storage means;
   means providing a precise oscillator output;
   means controlled by said oscillator output to release each of said successive digital words from said intermediate storage means in sequence at a predetermined rate; and
   means for receiving and converting said series of released digital words to analog values such that the desired electrical control signal having predetermined frequency characteristics is generated for application to drive said seismic vibrator.

2. A system for controlling a seismic vibrator as set forth in claim 1 wherein said means for receiving said played back successive digital words comprises:
   OR gate means receiving said played back successive digital words to provide a digital character count output;

shift register means actuated by said count output to provide a plurality of successively energized outputs;

a plurality of AND gate means receiving said digital electrical values at their inputs and conducting successive ones of said digital words as said AND gate means are successively enabled by the plurality of outputs from said shift register means; and a plurality of intermediate storage means connected to receive and store the output successive digital words from each of said gate means.

3. A system for controlling a seismic vibrator as set forth in claim 2 wherein each of said intermediate storage means comprises:

a plurality of flip-flop circuits actuated by the digital electrical outputs from said AND gate means.

4. A system for controlling a seismic vibrator as set forth in claim 1 wherein said means controlled by said oscillator comprises:

a plurality of AND gate means connected to receive at their input the plurality of digital electrical outputs from said intermediate storage means;

shift register means receiving said precise oscillator output to control shift actuation and providing a plurality of successive output enabling pulses to said plurality of AND gates to thereby enable each to release its respective digital word output.

5. A system for accurately controlling a seismic vibrator, comprising:

means for generating a control signal in the form of digital electrical signals occurring in successive digital words;

means receiving said digital words to provide a count output consisting of successive enabling pulses on a plurality of leads;

a plurality of AND gate means receiving each of the successive ones of the digital words and each gate means being responsive to a successive one of said enabling pulses to sequentially pass a digital word to a respective output;

a plurality of intermediate storage means receiving each of said digital word outputs from said gate means;

a plurality of second gate means receiving said plurality of stored digital words at their respective inputs;

means including a precision oscillator for enabling said plurality of second gate means successively at said oscillator rate to provide successive outputs of said digital words;

means for receiving and converting said successive digital word outputs to respective analog signal values and for combining said successive values to form an analog control signal.

6. A system for accurately controlling a seismic vibrator as set forth in claim 5 wherein said means for receiving digital words to provide a count output comprises:

OR gate means receiving said successive electrical signals of each digital word to provide a count pulse output; and shift register means having a plurality of outputs and receiving said count pulse at its input to thereby effect shift actuation to provide enabling pulse output on successive ones of said plurality of leads.

7. A system for accurately controlling a seismic vibrator as set forth in claim 5 wherein said means including a precision oscillator comprises:

oscillator means providing a pulse output at a precise, predetermined rate;

shift register means which is shift actuated by said oscillator pulse output to provide a plurality of successive enabling pulses on a plurality of leads to each of said second gate means.

8. A system for accurately controlling a seismic vibrator as set forth in claim 5 wherein said means for generating a digital control signal, comprises:

means for generating a digital control signal consisting of plural binary electrical pulses which occur as plural successive digital characters, each character being a plurality of simultaneous bits;

means for recording said digital control signal such that the simultaneous binary bits of each digital character are recorded in adjacent ones of plural channels;

plural pickup means for reading out the plural channels of said digital record such that all binary bits of each digital character are read out simultaneously.

9. A system for accurately controlling a seismic vibrator as set forth in claim 8 wherein said means receiving said digital words to provide a count output; comprises:

OR gate means receiving each of the binary bit values to provide a character count pulse output;

shift register means actuated by said character count output to provide successive enabling pulses on a plurality of output leads.

10. A system as set forth in claim 9 wherein said plurality of AND gate means comprises:

a plurality of gate means each receiving a separate one of said binary digital bit values at its input and all of said plurality of gate means being responsive to a predetermined one of said enabling pulses to simultaneously conduct digital character bit values to their respective outputs.

11. A system as set forth in claim 10 wherein each of said plurality of intermediate storage means comprises:

a plurality of bi-stable reaction means, each of which is controlled by a character digital bit output from one of said gate means of a corresponding AND gate means.

12. A system as set forth in claim 11 wherein said second gate means and said means including a precision oscillator comprise:

a plurality of word gate means each having an input connected to receive the output from one of said bi-stable reaction means;

shift register means actuated by said oscillator output at said digital word rate to provide successive enabling pulses simultaneously to said gate means to allow conduction of said stored digital word values.

13. Apparatus for generating a control signal having predetermined time-amplitude characteristics for application to control a seismic vibrator, comprising:

means for generating the desired control signal in the form of a series of digital electrical representations, each digital electrical representation comprising a digital word in the form of two serially arranged digital characters of simultaneous digital bits;

means for recording the digital control signal with each successive digital character serially recorded and each bit of each character simultaneously recorded on parallel record tracks;

transport means for receiving said record;

drive means including precision oscillator means for maintaining said transport speed nearly constant;

means for playing back the digital control signal values in the form of serial characters each represented by simultaneous digital electrical bit values in parallel;

a plurality of character gates each receiving the parallel digital bit value outputs from said playback means;

OR gate means receiving each of said digital bit values at its input to provide a character count pulse at its output;

character shift register means controlled by said character count pulse output to provide successive enabling outputs from said shift register means to each of said character gates to enable successive characters of digital electrical bit values through respective character gates in serial order;

a plurality of word storage means each receiving the output from two successively enabled character gates;

a plurality of word gates each connected to receive the output from respective word storage means;

shift register means actuated in synchronism with said precision oscillator of said drive means to provide an output pulse to each of said word gates in serial order thereby enabling serial outputs from said word gates, each output being simultaneous bit values of a digital word;

digital-to-analog converter means receiving said digital electrical values from said word gates and providing time sequential analog electrical values representative of said predetermined control signal.

References Cited
UNITED STATES PATENTS

| | | |
|---|---|---|
| 3,307,648 | 3/1967 | Masterson _____ 181—.5 |
| 3,307,649 | 3/1967 | Ball et al. |
| 3,323,105 | 5/1967 | Charske. |
| 3,340,499 | 9/1967 | Hadley. |

BENJAMIN A. BORCHELT, Primary Examiner

T. H. WEBB, Assistant Examiner

U.S. Cl. X.R.

340—15